US010025539B2

(12) United States Patent
Madasamy et al.

(10) Patent No.: US 10,025,539 B2
(45) Date of Patent: Jul. 17, 2018

(54) ADAPTIVE SELECTION OF RENDERING INTENT FOR NEGATIVE TEXT EMBEDDED WITH IMAGE OBJECTS

(71) Applicant: Xerox Corporation, Norwalk, CT (US)

(72) Inventors: Sankaralingam Madasamy, Tamil Nadu (IN); Arindam Das, West Bengal (IN); Karthik Jakkala, Telangana (IN)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 15/042,593

(22) Filed: Feb. 12, 2016

(65) Prior Publication Data

US 2017/0235528 A1    Aug. 17, 2017

(51) Int. Cl.
| | | |
|---|---|---|
| *G06K 9/00* | (2006.01) | |
| *G06F 3/12* | (2006.01) | |
| *G06T 5/50* | (2006.01) | |
| *H04N 1/00* | (2006.01) | |

(52) U.S. Cl.
CPC .......... *G06F 3/1208* (2013.01); *G06F 3/1211* (2013.01); *G06F 3/1219* (2013.01); *G06F 3/1248* (2013.01); *G06T 5/50* (2013.01); *H04N 1/00023* (2013.01); *G06T 2207/10024* (2013.01); *G06T 2207/20224* (2013.01)

(58) Field of Classification Search
None
See application file for complete search history.

(56) References Cited

U.S. PATENT DOCUMENTS

| | | | |
|---|---|---|---|
| 7,227,666 B1 | 6/2007 | MacLeod | |
| 7,408,678 B1 | 8/2008 | MacLeod | |
| 7,468,813 B1 | 12/2008 | MacLeod | |
| 7,639,262 B2 | 12/2009 | Danciu | |
| 8,467,089 B2 * | 6/2013 | Loce | G06K 15/02 358/1.9 |
| 8,477,323 B2 | 7/2013 | Low et al. | |
| 9,070,076 B1 | 6/2015 | Smith et al. | |
| 9,210,291 B2 | 12/2015 | Ichikawa | |
| 2009/0290883 A1 * | 11/2009 | Nakahara | G03G 15/0126 399/27 |
| 2011/0157619 A1 | 6/2011 | Nelson et al. | |
| 2011/0216086 A1 | 9/2011 | Hitosugi | |
| 2011/0249895 A1 * | 10/2011 | Lin | G06T 5/30 382/167 |
| 2012/0188569 A1 | 7/2012 | Yuan et al. | |

(Continued)

*Primary Examiner* — Barbara Reinier
(74) *Attorney, Agent, or Firm* — Kermit D. Lopez; Luis M. Ortiz; Ortiz & Lopez, PLLC

(57) ABSTRACT

Methods and systems for rendering an image. In an example embodiment, a step or operation can be implemented to pre-render white objects in an image with a background image set to a single complementary color. Such a single complimentary color assists in obtaining the textual content only from the complex background. A connected component analysis can be performed with respect to said image to identify elements in said images that should be rendered as objects composed of text and graphics. Tags are then assigned for final rendering of the image after performing said component analysis with respect to said image. Modification of tag values with respect to said images avoids unwanted artifacts such as, for example, bleed through, background closing, ghost effects, etc.

15 Claims, 9 Drawing Sheets

(56) References Cited

U.S. PATENT DOCUMENTS

| | | |
|---|---|---|
| 2013/0011054 A1 | 1/2013 | Doll |
| 2014/0022566 A1 | 1/2014 | Hoes et al. |
| 2014/0254926 A1* | 9/2014 | Abdo ................. G06K 9/00463 |
| | | 382/165 |
| 2015/0187329 A1 | 7/2015 | Ciaramitaro |

* cited by examiner

ADAPTIVE SELECTION OF RENDERING INTENT FOR NEGATIVE TEXT EMBEDDED WITH IMAGE OBJECTS

TECHNICAL FIELD

Embodiments are generally related to the field of image processing. Embodiments also relate to the selection of rendering intent. Embodiments further relate to printing devices that generate color or black and white reproductions of documents. Embodiments also relate to RIP (Raster Image Processing) technologies.

BACKGROUND

The reproduction of documents as images on media sheets generally requires the generation of a source file, the translation of the source file, and the interpretation of the translated file to reproduce an image of the source data. In the first stage, a user can generate or edit a source document data file utilizing an application program or imaging device. The source data file may include text, images, and graphics as well as font characteristics, format codes, and the like.

To print the source file onto a substrate, the source data file is translated to a page description format that is implemented with a page description language (PDL), such as PostScript, PDF, PCL, TIFF, SVG, Metro, or the like. The device-dependent data may be translated to a device-independent color space, such as CIELAB, XYZ, a spot color space such as Pantone, or a profile connection space (PCS). PCS space is defined by one of the profiles that have been developed by the International Color Consortium (ICC). The PDL commands and device-independent color data are provided to a marking or print engine for processing. The print engine decomposes the device-independent data and converts the device-independent color data to the color space of an output device, such as an image output terminal (IOT). The decomposition of the document file includes the interpretation of the PDL commands, which enables the print engine to optimize the imaging of individual objects on a page. The printing device may then be used to generate the raster data that are used to print color images of the document.

Generation of the device-independent data also includes the specification of output parameters for the printing of a job at the printing device. Output parameters that may be selected or adjusted for output of a job include the color, weight, coating, opacity, and white point of the substrate on which a document is reproduced.

Another output parameter that may be defined for a print job is referred to as a rendering intent or render intent. Examples of rendering intents include "perceptual," "saturation," "absolute calorimetric," and "relative colorimetric," all of which are specified by the ICC. Another rendering intent example is "pure." This rendering intent is specified by the Color Encoding Standard, which is part of the Xerox System Integration Standard published by Xerox Corporation, Palo Alto, Calif., July 1991, XNSS 289107 (hereinafter "The Xerox Color Encoding Standard"). The Xerox Color Encoding Standard describes three reference color systems that attempt to provide device independent color between devices, such as workstations and printers. Each rendering intent can specify an enhancement for a particular context. For example, "perceptual" makes photographic images more life-like, while "saturation" makes colors brighter and is useful to enhance the look of pie charts, for example. Some output parameters, such as rendering intents, may be specified for different portions or objects of the same page. For example, different rendering intents may be specified for a photographic image, a pie chart, and text that are presented on the same page.

Rendering intents can assist a printing device in producing a higher quality output. One set of intents may specify a particular halftone that is appropriate for a particular object. For example, a high frequency halftone may be especially appropriate for the edges of text and line art, while a lower frequency halftone may be specified for areas in which the range of color intensities are more important. "Glossmarks," for example, may be implemented utilizing rendering intents that specify complementary halftones. Also, compression may be used within a real time format that drives a print engine. A rendering intent may be used to identify an appropriate compression for an object, such as lossy compression for JPEG images, for example, or lossless compression, such as flate, LZW, CCITT Group 4 methods for line art, and text.

A user, such as a graphic designer, may design a document with an image or graphic as background along with any image object to render white texts scattered across the complete page or a portion of the page in order to create a perception of white text on the designed background. Such an approach is a challenge to RIP the background and white text in particular.

The RIP system is really concerned about the quality and in general (not considering the scenario) different kinds of objects are assigned to different rendering intents and compressed differently. An incorrect tag assignment can create a ghosting effect, which can negatively impact the final image quality for small image white text in a rendered image. Considering an image as a background and small image white texts on images, the imager may assign the perceptual rendering intent as tag values for all the pixels in the image. In this scenario, from a perceptual quality perspective the entire image along with the tiny text produces a quality defect due to the background image pixels bleeds into white text region when printing.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved methods and systems for rendering images.

It is another aspect of the disclosed embodiments to provide improved methods and systems for selecting rendering intents.

The aforementioned aspects and other objectives and advantages can now be achieved as described herein. In an example embodiment, a step or operation can be implemented to pre-render white objects in an image with a background image set to a single complementary color. A connected component analysis can be performed with respect to the image to identify elements in the images that should be rendered as objects composed of text and graphics. Tags are then assigned for final rendering of the image after performing the component analysis with respect to the image.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
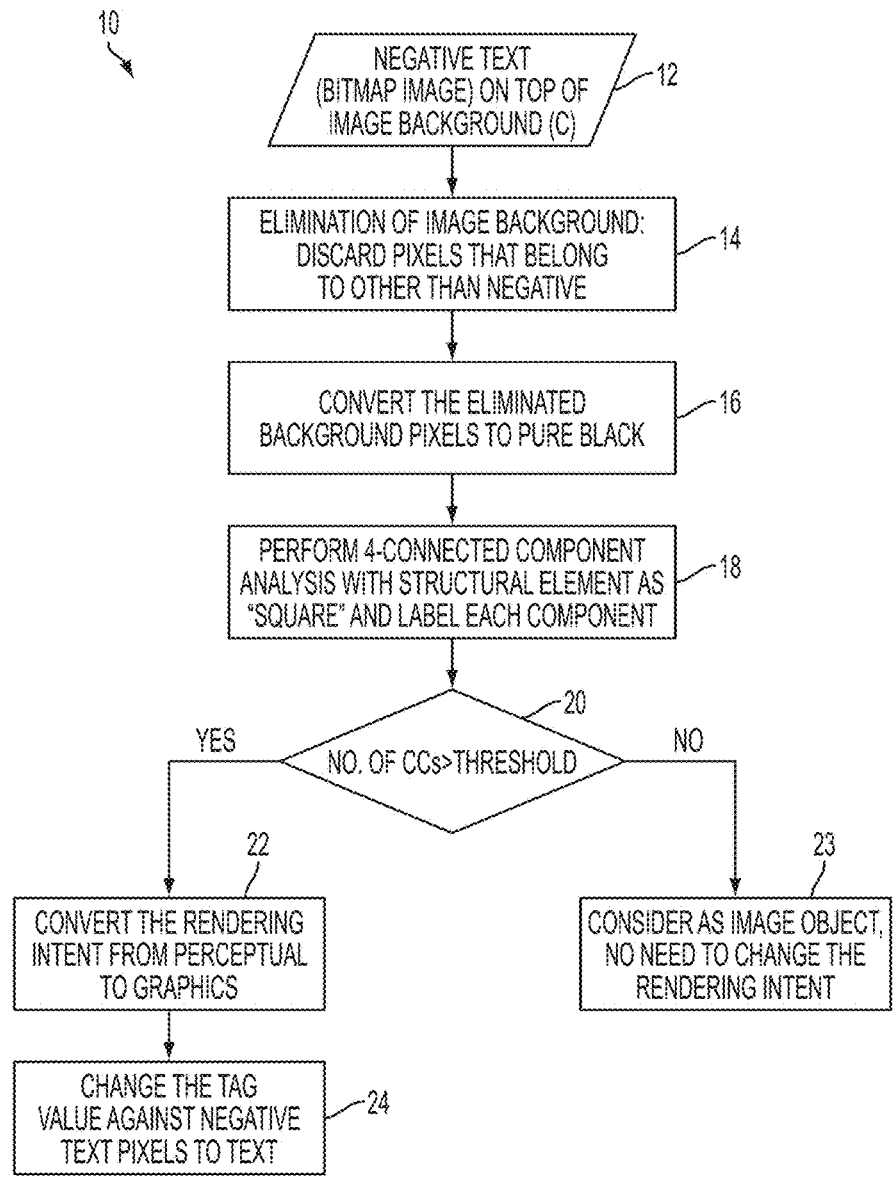
FIG. 1 illustrates a flow chart of operations depicting logical operational steps of a method for the adaptive selection of rendering intent for negative text embedded with image objects, in accordance with an example embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be interpreted in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Note that as utilized herein, the term RIP can refer to "Raster Image Processing" or variations thereof. A "RIPed" image, for example, is an image subject to a RIP device or methodology.

In an example embodiment, white text objects can be identified, which are designed utilizing any image type with the darker image object as background to improve the overall perceptual quality of the RIPed image. The disclosed approach first eliminates an image background other than negative/white text and then maps all the image pixels with zero valued pixels as black pixel(s). The processed binary image object (with black and white pixels only) can then be subject to a 4-connected component analysis module to identify the negative/white text objects on or with respect to the image objects. When there is no negative text (or texts) on top of image object, an operation can be automatically implemented to select the perceptual rendering intent and corresponding tag values for the image objects. Note that the tag values can be modified in the images to avoid unwanted rendering artifacts such as, for example, bleed through, background closing, ghost effects, etc.

When there are negative text objects identified through connected component analysis and the connected component count is more than the predefined threshold, an operation can be automatically implemented, which selects the rendering intent and corresponding tag values for the image object as for graphics object tag values. The disclosed embodiments can thus identify any image with the presence of negative text objects on the darker image and be assigned with intent/tag values used for text/graphics objects. Such an approach improves the performance of the final image quality to a great extent and avoids the image objects pixels bleeds through the negative text when rendering (e.g., printing) the RIPPed images and thereby avoids the image quality defect. Additionally, such an approach ensures a much better appearance of small negative text on image objects, which should be appearing legibly and perfectly as white text after printing the job.

The disclosed approach improves the perceptual quality of the RIPed image for the aforementioned scenario without much affecting the ripping performance. Such an approach also reduces the toner usage on the mentioned scenario objects when printed by avoiding the unnecessary usage of toners on the small negative text and on the surrounding region of bigger negative text objects, so the resultant toner usage will be less than the originally printed without this invention and without losing the perceptual quality of the job.

FIG. 1 illustrates a flow chart of operations depicting logical operational steps of a method 10 for the adaptive selection of rendering intent for negative text embedded with image objects, in accordance with an example embodiment. As depicted in FIG. 1, block 12 represents negative text (e.g., a bitmap image) on top of an image background. Thereafter, as depicted at block 14, a step or logical operation can be implemented to eliminate the image background by discarding pixels that belong to other than the negative. Then, as illustrated at block 16, a step or logical operation can be implemented to convert the eliminated background pixels to pure black. Thereafter, as shown at block 18, a step or logical operation can be implemented to perform a component analysis (e.g., a 4-connected component analysis) operation with a structural element as a "square" (to be explained in further detail herein) and label each component.

Next, as indicated at decision block 20, a step or operation can be implemented to determine if the number of connected components (CCs) are above a particular threshold. If not, then as shown at block 23, a step/operation can be implemented to consider the image object, meaning there is no need to change the rendering intent. Assuming the answer its response to the operation depicted at block 20 is "yes," then the operations illustrated at blocks 22 and 24 can be implemented/processed. As shown at block 22, a step or logical operation can be implemented to convert the rendering intent from perceptual to graphics. Then, as indicated at block 24, a step or operation can be implemented to change the tag value against negative text pixels to text.

In order to further explain the above-referenced steps/operations of method 10, two scenarios are now described, which indicate how the disclosed example embodiments can effectively improve, for example, image quality and toner usage. The first scenario or example embodiment involves non-overlapped small image negative text spread across a larger or "big" image object. Here, the smaller image can be considered as negative text (also referred to as "negative texts"). In this scenario, the darker image background object size should be equal or more than the smaller negative text objects boundary region and should entirely cover the smaller objects.

In this first scenario, a process flow can be implemented as follows. First, a user submits a job (e.g., PDF or PS formats). An interpreter (e.g., an interpreter module) begins identifying the type of objects contained in the job and sends the job to an imager module (e.g., imager module) for flattening, and tag values utilized for printing can be assigned. The objects can then be subject to the following process. The background image is removed to generate the binary image and is then subject to the connected component analysis operation and negative texts are then identified. An operation is then implemented to check for the number of connected components. It the count is less than the pre-defined threshold (e.g., see decision block 20 in FIG. 10), image tag values are assigned for the image objects. Graphics tag values are assigned for the image objects if the number of connected components is greater than the pre-defined threshold.

Figure 2:
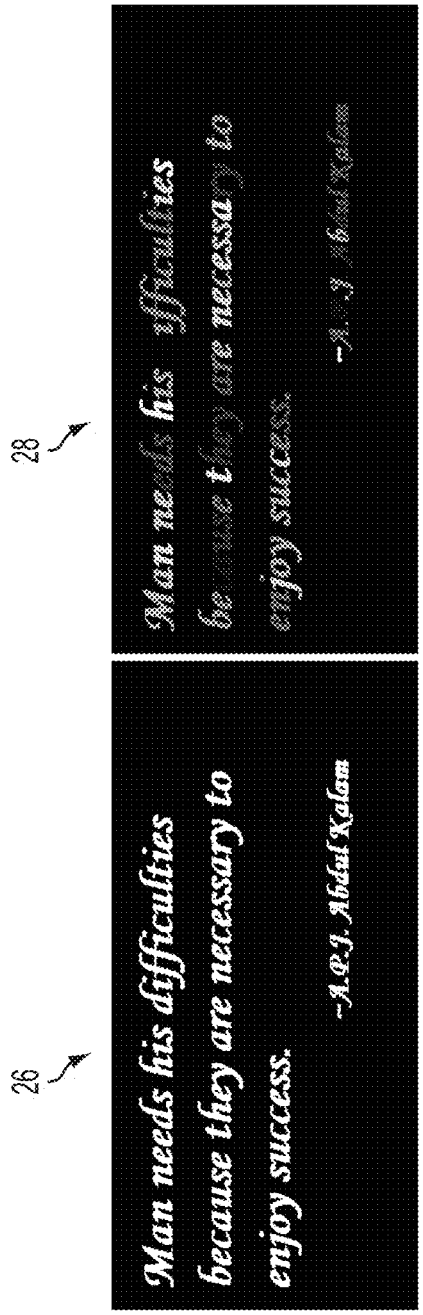
FIG. 2 illustrates an example embodiment of a sample image having negative text embedded therein and a sample image including labeled negative text with 4-connected components, in accordance with an example embodiment.

FIG. 2 depicts an example embodiment of a sample image having negative text embedded (e.g., as shown on the left image 26 in FIG. 2) and the labeled negative text with 4-connected components (e.g., as shown in image 28 on the right side of FIG. 2). A pre-tag assignment module can then be executed if all the above conditions described with respect to this first are satisfied. A pre-flattening module can be utilized to identify the image having white text objects with the background image object and create one image object, followed by assignment of the tag values. Flattening of all objects can take place after pre-flattening.

A second scenario involves an example of toner usage reduction in the context of larger size objects with any image object spread across the background image object (or objects). In this example scenario, a user may submit a job (e.g., PDF, PS, TIFF, or supported formats which come under any Page Description Language). The interpreter can then begin to identify the type of objects and also begin sending the job to the imager. Objects can then be subject to the process flow of, for example, method 10 shown in FIG. 1, to identify the negative texts. Assigning graphics tag values to image objects thus reduces toner usage.

Figure 3:
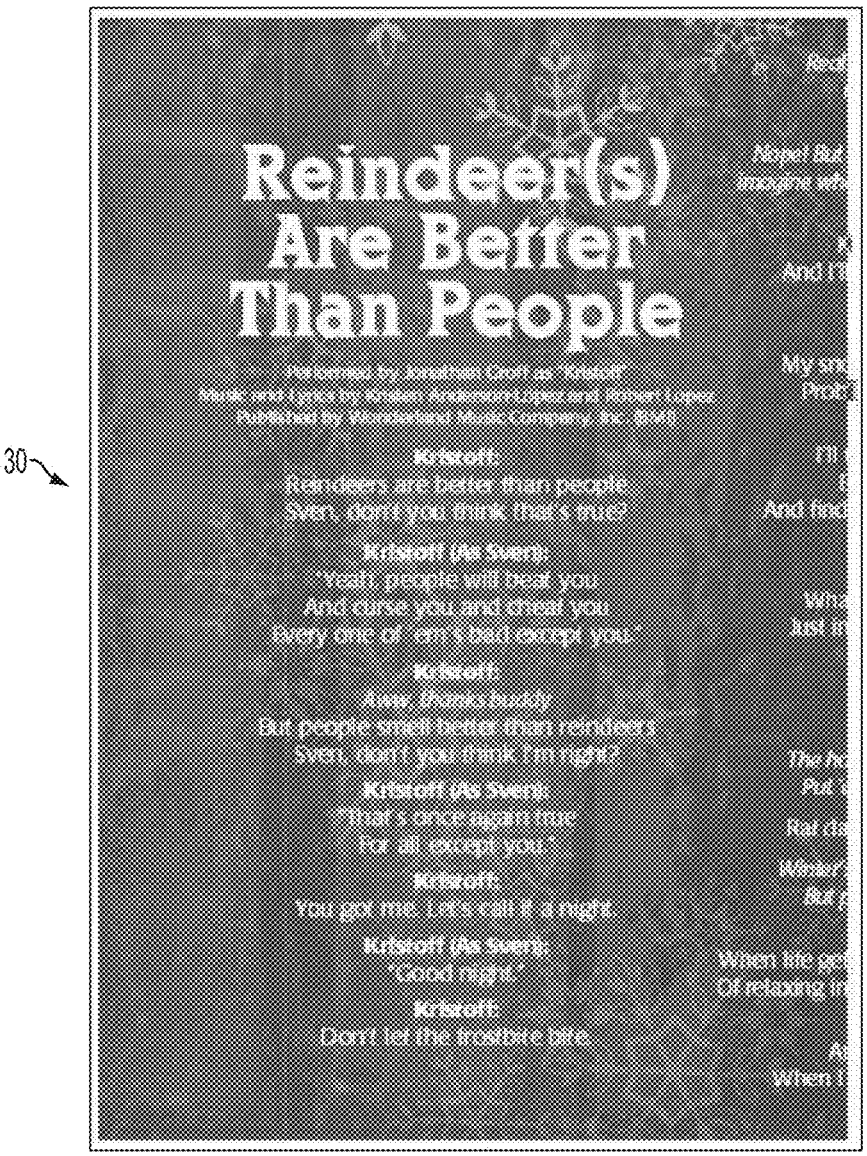
FIG. 3 illustrates a test image having negative text embedded therein, accordance with an example embodiment.
Figure 4:
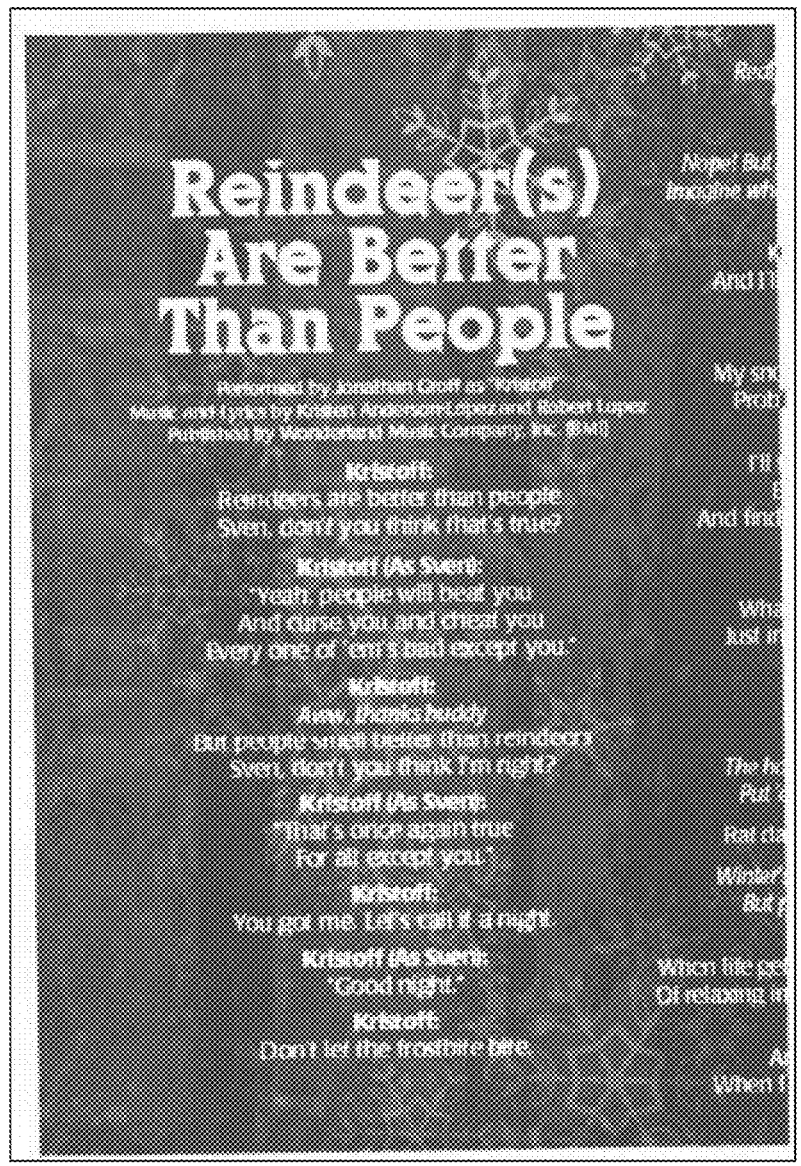
FIG. 4 illustrates a scanned copy of a hard printed image removed per prior art approaches for the selection of a rendering intent.
Figure 5:
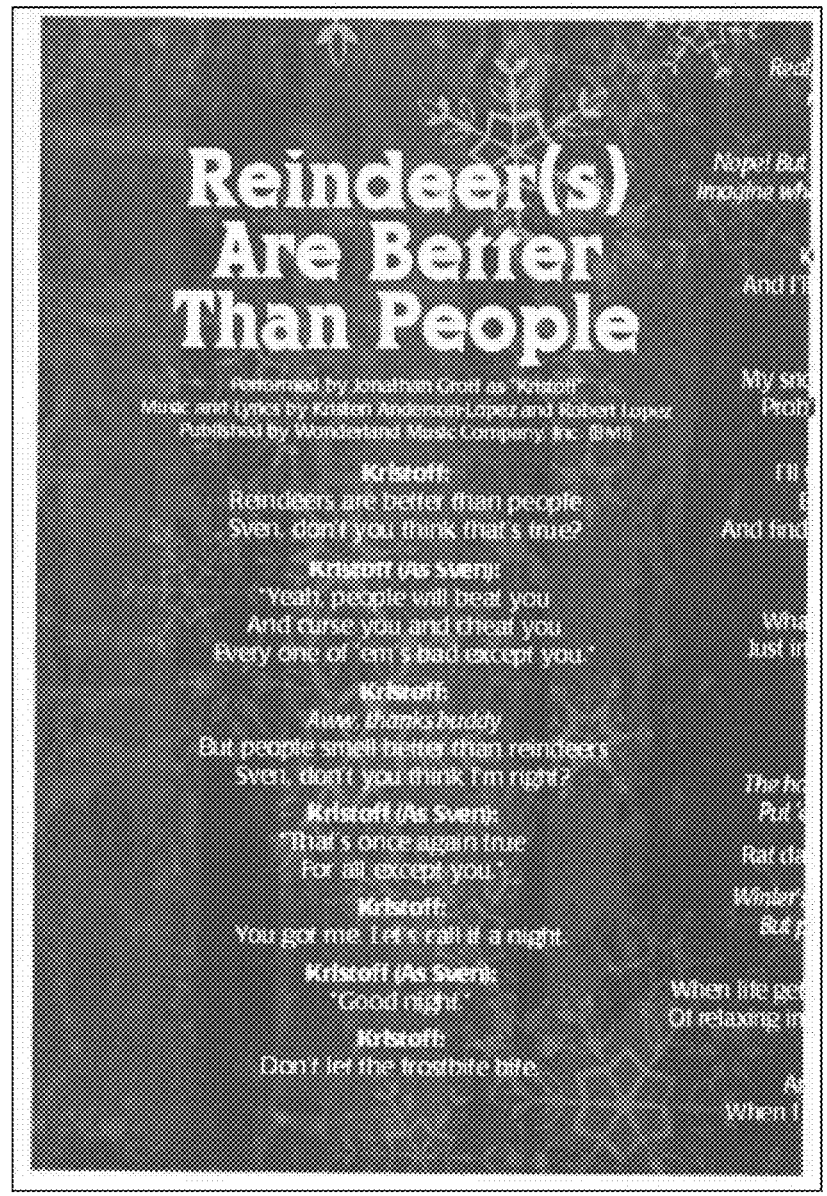
FIG. 5 illustrates a scanned copy of a hard printed image removed per the disclosed approach of the adaptive selection of rendering intent, in accordance with an example embodiment.
Figure 6:
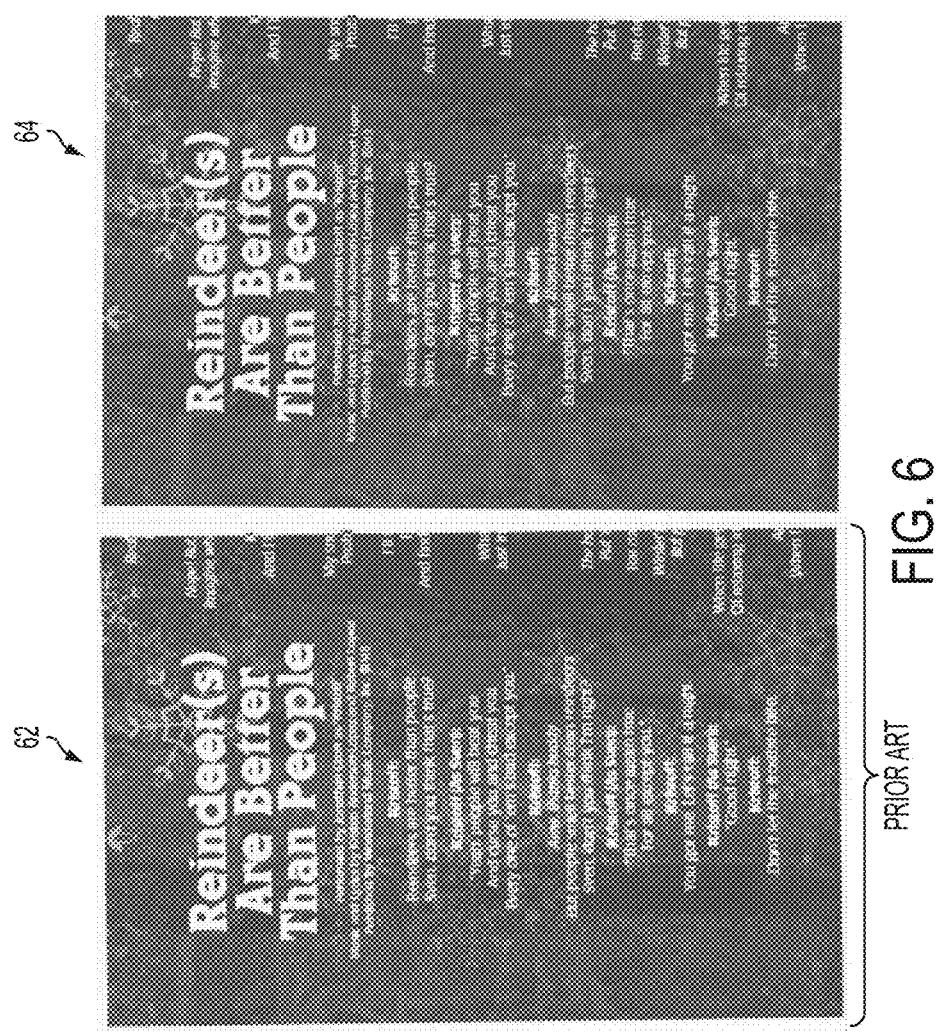
FIG. 6 illustrates images comparing a prior rendering approach with that of the disclosed approach, in accordance with an example embodiment.

FIGS. 3-7 depict a variety of respective images 30, 40, 50, 62, 64, 72, and 74 depicting the results of processing operations such as those described above. FIG. 3 depicts a test image 30 having negative text embedded therein, in accordance with an example embodiment. FIG. 4 illustrates a scanned copy of a hard printed image 40 removed per a current design of the selection of rendering intent. FIG. 5 illustrates a scanned copy of a hard printed image 50 removed per the disclosed approach of the adaptive selection of rendering intent, in accordance with an example embodiment. FIG. 6 illustrates images 62 and 64, in accordance with an example embodiment. In FIG. 6, a comparison can be made between the prior rendering approach (e.g., image 62 shown at the left side of FIG. 6) and the disclosed rendering approach (e.g., image 64 shown at the right side of FIG. 6). FIG. 6 thus illustrates images that compare the prior rendering approach with that of the disclosed approach.

To date, the selection of rendering intent has been subject to very little compromising in terms of aiming for a high image quality where the appearance of negative text embedded with any image object is evident. With the disclosed approach, however, negative texts can be identified separately even if they are embedded with image objects. The process of identifying negative text can be implemented via, for example, a 4-connected component analysis. This process results in selecting the proper rendering intent to obtain assigned tag values of type text against the pure white pixels. With the above-explained logical solution, significantly better results can be attained in comparison with the result produced from the approach (e.g., see FIG. 6). To overcome the limitations of the prior art, which is to some extent concerned with only negative texts embedded with any image objects, the proposed embodiments provide a reasonable logical solution (which has been validated), which undoubtedly ensures the pursuit of higher image quality.

Figure 7:
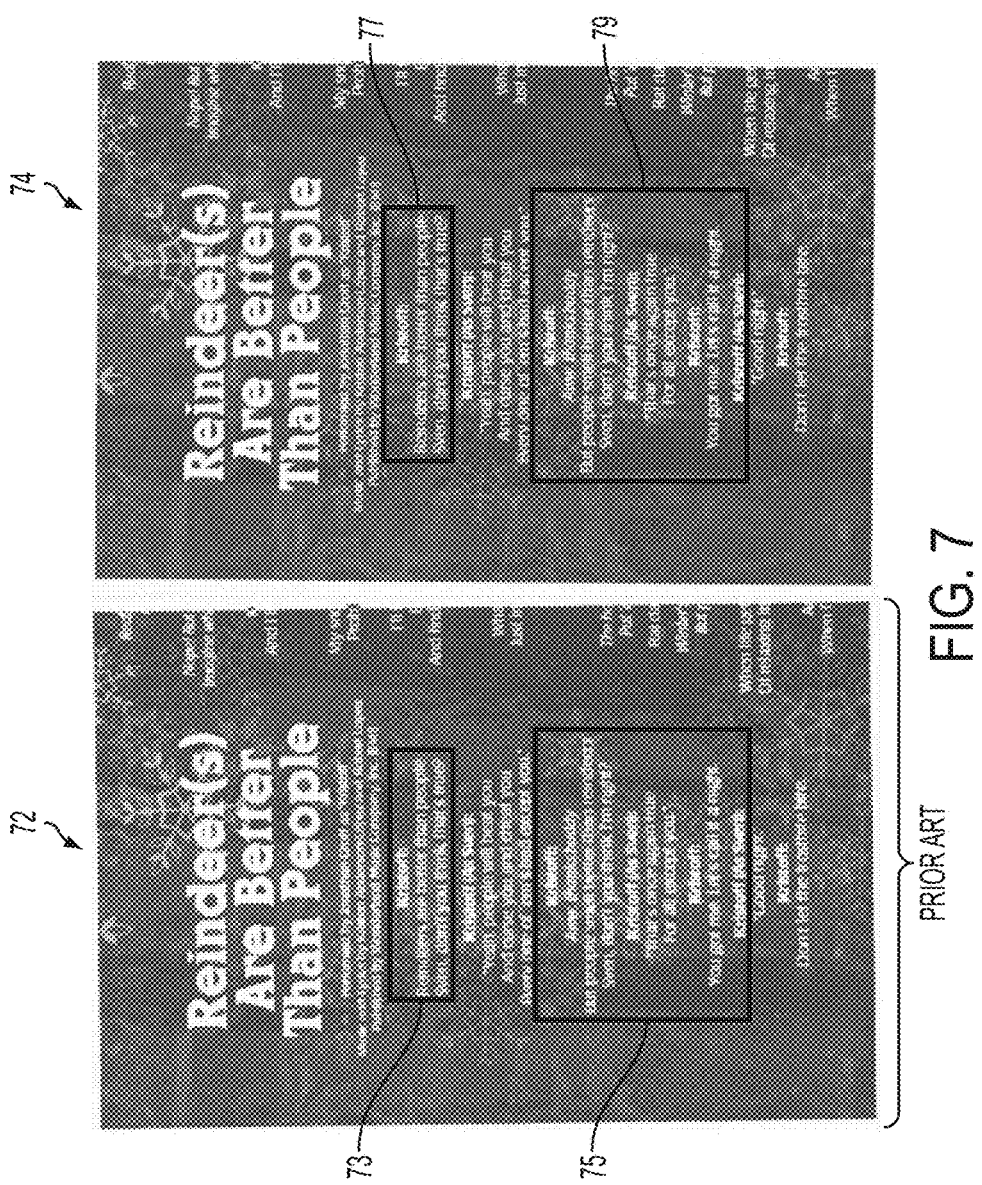
FIG. 7 illustrates images with highlighted portions where significant changes are observed, in accordance with an, example embodiment.

Per the effect of the disclosed approach, all text in an image can be affected. FIG. 7 shows images 72, 74 with highlighted portions 73, 75, 77, and 79 where significant changes are observed, in accordance with an example embodiment. Major changes in hard prints derived from the prior approaches (e.g., see image 72, left side of FIG. 7) are shown in FIG. 7 with respect to that provided by disclosed embodiments (e.g., see image 74, right side of FIG. 7).

The disclosed approach offers positive impacts to different aspects of existing rendering systems. For example, upon incorporating the disclosed approach, an existing rendering system will be able to identify negative texts, which are embedded with image objects of any type. Additionally, some unwanted artifacts such as ghost effects and bleed through will become obsolete to observe for negative text embedded with image object. Also, an ample amount of toner can be saved while printing in, for example, IOT by identifying negative texts.

In some situations, white pixels can be considered as having some gray values, which do not address or correspond to pure white pixels. Thus, during a rendering operation (e.g., printing) some amount of toner may be utilized which corresponds to the gray value. Instead, if all the negative text can be identified properly, then for pure white pixels the toner will not be needed. The result of such benefits leads to increased user satisfaction, because the user, will not obtain any unwanted artifacts in the rendered job.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 8:
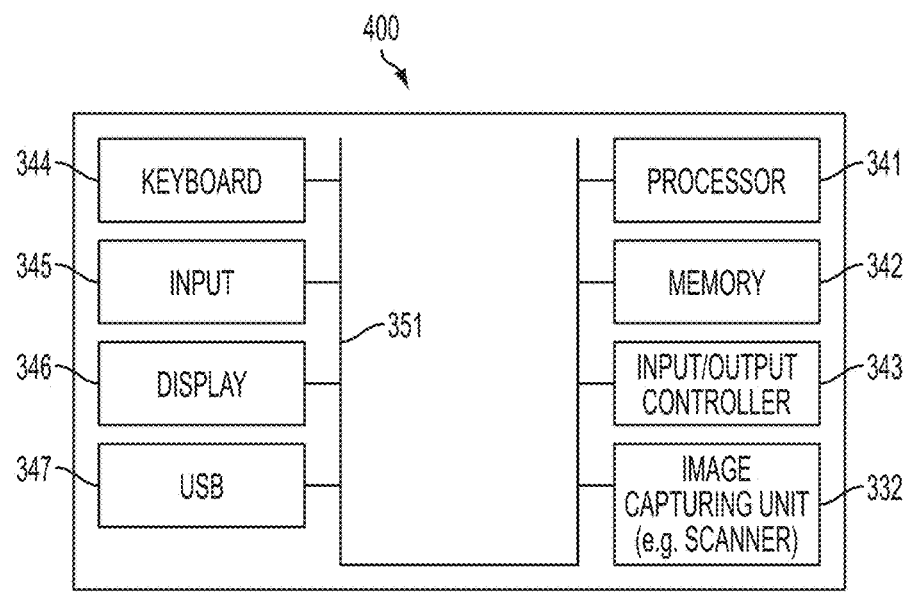
FIG. 8 illustrates a schematic view of a computer system, in accordance with an example embodiment.
Figure 9:
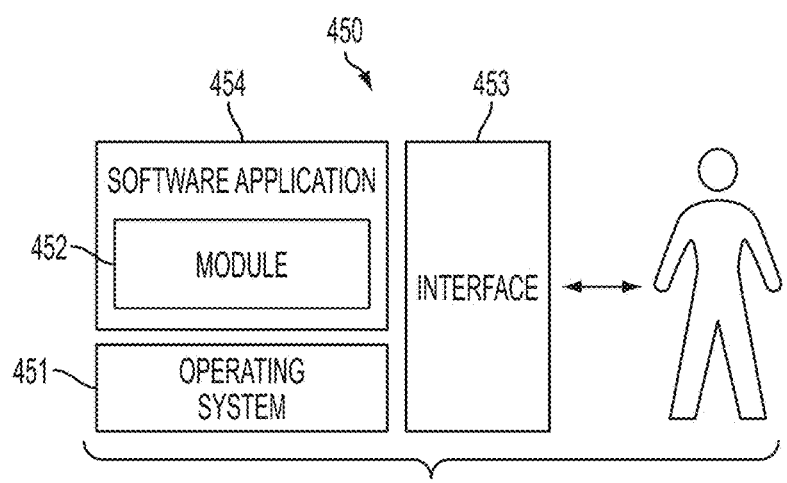
FIG. 9 illustrates a schematic view of a software system including a module, an operating system, and a user interface, in accordance with an example embodiment.

FIGS. 8-9 are shown only as exemplary diagrams of data-processing environments in which embodiments may be implemented. It should be appreciated that FIGS. 8-9 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 8, some embodiments may be implemented in the context of a data-processing system 400 that can include one or more processors such as processor 341, a memory 342, a controller 343 (e.g., an input/output controller), a peripheral USB (Universal Serial Bus) connection 347, a keyboard 344 (e.g., a physical keyboard or a touch screen graphically displayed keyboard), an input component 345 (e.g., a pointing device, such as a mouse, track ball, pen device, which may be utilized in association or with the keyboard 344, etc.), a display 348, and in some cases, an image-capturing unit 332 (e.g., a scanner, digital camera, etc). In some example embodiments, data-processing system 400 may be, for example, a client-computing device (e.g., a client PC, laptop, tablet computing device, etc.), which communicates with peripheral devices (not shown) such as networked printers via a client-server network (e.g., wireless and/or wired), wherein such peripheral devices communicate with the client-computing device via a computing network. In other example embodiments, the data-processing system 400 may function as a server in the context of a client-server computing network.

As illustrated, the various components of data-processing system 400 can communicate electronically through a system bus 351 or similar architecture. The system bus 351 may be, for example, a subsystem that transfers data between, for example, computer components within data-processing system 400 or to and from other data-processing devices, components, computers, etc. Data-processing system 400 may be implemented as, for example, a server in a client-server based network (e.g., the Internet) or can be implemented in the context of a client and a server (i.e., where aspects are practiced on the client and the server). Data-processing system 400 may be, for example, a standalone desktop computer, a laptop computer, a Smartphone, a pad computing device, a server, and so on.

FIG. 9 illustrates a computer software system 450 for directing the operation of the data-processing system 400 shown in FIG. 8. Software application 454 stored, for example, in memory 342, generally includes a module 452. The software system 450 further includes a kernel or operating system 451 and a shell or interface 453. One or more application programs, such as software application 454, may be "loaded" (i.e., transferred from, for example, memory 342 or another memory location) for execution by the data-processing system 400. The data-processing system 400 can receive user commands and data through the interface 453; these inputs may then be acted upon by the data-processing system 400 in accordance with instructions from operating system 451 and/or software application 454. The interface 453, in some embodiments, can serve to display results, whereupon a user may supply additional inputs or terminate a session.

The software application 454 can include one or more modules such as module 452, which can, for example, implement instructions or operations such as those described herein. Examples of instructions that can be implemented by module 452 include steps or operations such as those shown and described herein with respect to blocks 12, 14, 16, 18, 20, 22, 23, 24 of FIG. 1 and elsewhere herein.

The following discussion is intended to provide a brief, general description of suitable computing environments in which the system and method may be implemented. Although not required, the disclosed embodiments will be described in the general context of computer-executable instructions, such as program modules being executed by a single computer. In most instances, a "module" constitutes a software application. However, a module may also be composed of, for example, electronic and/or computer hardware or such hardware in combination with software. In some cases, a "module" can also constitute a database and/or electronic hardware and software that interact with the database.

Generally, program modules include, hut are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that, actually implements the routines in the module. The term module may also simply refer to an application, such as a computer program designed to assist in the performance of a specific task, such as word processing, accounting, inventory management, etc. A module can also be composed of other modules or sub-modules. Thus, the instructions or steps such as those shown in FIG. 1 and discussed elsewhere herein can be implemented in the context of such a module, modules, sub-modules, and so on.

FIGS. 8-9 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

Figure 10:
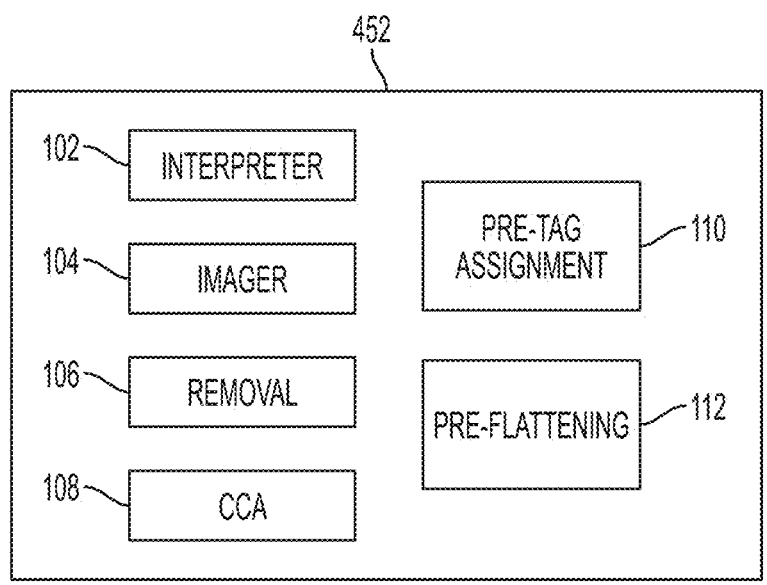
FIG. 10 illustrates a block diagram further depicting modules or sub-modules of the module shown in FIG. 9, in accordance with an example embodiment.

FIG. 10 illustrates a block diagram further depicting modules or sub-modules of the module 452 shown in FIG. 9, in accordance with an example embodiment. The module 452 can be composed of, for example, an interpreter 102 (i.e., an interpreter module), an imager 104 (e.g., an imager module), a background removal module 106, a CCA (Connected Component Analysis) module 108, a pre-tag assignment module 110, and a pre-flattening module 112.

The interpreter 102 can begin to identify types of objects with respect to a job submitted by a user, and then sends the job to the imager 104 for flattening and assigning the tag values to be used when printing. The objects can be subject to, for example, a removal module 106, which removes the background image object to generate a binary image, which is then subject to a connected component analysis operation via the CCA module 108 to identify negative text.

The CCA module 108 checks for the number of connected components. If the count is less than a predefined threshold, image tag values are assigned to the image objects. Graphics tag values are assigned to the image objects if the number of connected components determined via the CCA module 108 is greater than the predefined threshold. A pre-tag assignment module 110 can be executed if all the above conditions are satisfied. The pre-flattening module 112 identifies the image having white text objects with a background text object create one image object and then tag values are assigned.

In some example embodiments, the interpreter 102 and image 104 can be implemented in the context of a raster image processor (RIP), such as may be used to prepare the job for printing. As indicated previously, an RIP is a component used in a printing system that produces a raster image, also known as a bitmap. The bitmap is then sent to a printing device for output. Raster image processing is the process that turns the job input information into a high-resolution raster image. The input may be a page description using a page description language (PDL) of higher or lower resolution than the output device. In the latter case, the RIP applies either smoothing or interpolation to the input bitmap to generate the output bitmap.

Based on the foregoing, it can be appreciated that a number of example embodiments, preferred and alternative, are disclosed herein. In one example embodiment, a method can be implemented for rendering an image. Such a method can includes steps or logical operations such as, for example: pre-rendering white objects in an image with a background image set to a single complementary color; performing a connected component analysis with respect to the image to identify elements in the image to be rendered as objects composed of text and graphics; and assigning tags for final rendering of the image after performing the component analysis with respect to the image. In some example embodiments, the aforementioned tags can include tag values. In another example embodiment, a step or logical operation can be implemented for modifying the tag values in the image to avoid unwanted rendering artifacts.

In another example embodiment, step or logical operation of performing a connected component analysis with respect to the image to identify elements in the images that should be rendered as objects composed of text and graphics can further include a step or logical operation for determining if a number of connected components exceeds a threshold. In yet another embodiment, the aforementioned connected component analysis can be a 4-connected component analysis.

In yet another example embodiment, a step or operation can be implemented for rendering the image as a raster image processed image via a raster image processor after the assigning the tags for final rendering of the image. In yet another example embodiment, the aforementioned tag values can include data indicative of a rendering intent with respect to rendering the image.

In still another example embodiment, a system for rendering an image can be implemented. Such a system can include, for example, one or more processors and a computer-usable medium embodying computer program code. Such a computer-usable medium is capable of communicating with one or more of the processors. The computer program code can include instructions executable by the processor (or processors) and configured, for example, for pre-rendering white objects in an image with a background image set to a single complementary color; performing a connected component analysis with respect to the image to identify elements in the image to be rendered as objects composed of text and graphics; and assigning tags for final rendering of the image after performing the component analysis with respect to the image.

In yet another example embodiment, a non-transitory processor-readable medium storing code representing instructions to cause a process for rendering an image can be implemented. In such an example embodiment, such code can further include code that is configured to; pre-render white objects in an image with a background image set to a single complementary color; perform a connected component analysis with respect to the image to identify elements in the image to be rendered as objects composed of text and graphics; and assign tags for final rendering of the image after performing the component analysis with respect to the image.

It will be appreciated that variations of the above-disclosed and other features and, functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for selecting a rendering intent utilized for rendering of an image by a printer, said method comprising:
    pre-rendering white objects in an image with a background image set to a single complementary color;
    identifying elements in said image to be rendered by a printer as objects composed of text and graphics, wherein said identifying is based on a 4-component connected component analysis that checks for a number of connected components in said image;
    flattening said image after said identifying said elements in said image, wherein said identifying said elements in said image includes identifying types of objects contained in said image; and
    assigning tags that avoid image object pixel bleeds through negative text during rendering of said image on a physical substrate by said printer, wherein said tags are assigned in a pre-flattening operation and before said flattening of said image, said tags comprising tag values indicative of a rendering intent for said negative text embedded with image objects, said rendering intent to be utilized for said rendering of said image on said physical substrate, said rendering on said physical substrate involving transforming said image from a digital format to a physical printed format on said physical substrate via said rendering by said printer, which improves final image quality of said image rendered on said physical substrate by said printer.

2. The method of claim 1 wherein said tags comprises tag values utilized for printing of said image on said physical substrate by said printer as a printed image, wherein said final rendering of said image includes said printing of said image, wherein said printing comprises transforming said image from said digital image into said printed image.

3. The method of claim 2 further comprising modifying said tag values in said image to avoid unwanted rendering artifacts on said physical substrate after rending of said image by said printer and wherein an interpreter identifies said types of objects with respect to a job submitted by a user, said job including said image, and wherein said interpreter sends said job to an imager for said flattening for assigning said tag values and wherein said image objects are subject to a removal operation that removes a background image object among said image objects to generate a binary image that is subject to said connected component analysis to identify said negative text.

4. The method of claim 2 further comprising performing said connected component analysis with respect to said image to identify elements in said image that should be rendered as objects composed of text and graphics, if said number of said connected components exceeds a threshold.

5. The method of claim 2 wherein said tag values include graphic tag values that are assigned to said objects comprising image objects if said number of connected components is greater than a predefined threshold and wherein an interpreter identifies said types of objects with respect to a job submitted by a user, said job including said image, and wherein said interpreter sends said job to an imager for said flattening for assigning said tag values and wherein said image objects are subject to a removal operation that removes a background image object among said image objects to generate a binary image that is subject to said connected component analysis to identify said negative text.

6. A system for selecting a rendering intent utilized for rendering an image by a printer, said system comprising:
    at least one processor; and
    a non-transitory computer-usable medium embodying computer program code, said computer-usable medium capable of communicating with said at least one processor, said computer program code comprising instructions executable by said at least one processor and configured for:
    identifying elements in said image to be rendered by a printer as objects composed of text and graphics, wherein said identifying is based on a 4-component connected component analysis that checks for a number of connected components in said image;
    flattening said image after said identifying said elements in said image, wherein said identifying said elements in said image includes identifying types of objects contained in said image; and
    assigning tags that avoid image object pixel bleeds through negative text during rendering of said image on a physical substrate by said printer, wherein said tags are assigned in a pre-flattening operation and before said flattening of said image, said tags comprising tag values indicative of a rendering intent for said negative text embedded with image objects, said rendering intent to be utilized for said rendering of said image on said physical substrate, said rendering on said physical substrate involving transforming said image from a digital format to a physical printed format on said physical substrate via said rendering by said printer, which improves final image quality of said image rendered on said physical substrate by said printer.

7. The system of claim 6 wherein said tags comprises tag values utilized for printing of said image on said physical substrate by said printer as a printed image, wherein said final rendering of said image includes said printing of said image, wherein said printing comprises transforming said image from said digital image into said printed image.

8. The system of claim 7 wherein said instructions are further configured for modifying said tag values in said image to avoid unwanted rendering artifacts.

9. The system of claim 8 wherein said instructions are further configured for performing said connected component analysis with respect to said image to identify elements in said image that should be rendered as objects composed of text and graphics, if said number of said connected components exceeds a threshold and wherein said connected component analysis comprises a four-connected component analysis and wherein an interpreter identifies said types of objects with respect to a job submitted by a user, said job including said image, and wherein said interpreter sends said job to an imager for said flattening for assigning said tag values and wherein said image objects are subject to a removal operation that removes a background image object among said image objects to generate a binary image that is subject to said connected component analysis to identify said negative text.

10. The system of claim 8 wherein said tag values include graphic tag values that are assigned to said objects comprising image objects if said number of connected components is greater than a predefined threshold.

11. A non-transitory processor-readable medium storing code representing instructions to cause a process for selecting a rendering intent utilized for rendering an image by a printer, said code comprising code to:
   pre-render white objects in an image with a background image set to a single complementary color;
   identify elements in said image to be rendered by a printer as objects composed of text and graphics, wherein said identifying is based on a 4-component connected component analysis that checks for a number of connected components in said image;
   flatten said image after said identifying said elements in said image, wherein said identifying said elements in said image includes identifying types of objects contained in said image; and
   assign tags that avoid image object pixel bleeds through negative text during rendering of said image on a physical substrate by said printer, wherein said tags are assigned in a pre-flattening operation and before said flattening of said image, said tags comprising tag values indicative of a rendering intent for said negative text embedded with image objects, said rendering intent to be utilized for said rendering of said image on said physical substrate, said rendering on said physical substrate involving transforming said image from a digital format to a physical printed format on said physical substrate via said rendering by said printer, which improves final image quality of said image rendered on said physical substrate by said printer.

12. The processor-readable medium of claim 11 wherein said tags comprises tag values utilized for printing of said image by said printer, wherein said final rendering of said image by said printer includes said printing of said image, wherein said printing by said printer comprises transforming said image from said digital image into a printed image.

13. The processor-readable medium of claim 12 wherein said code further comprises code to modify said tag values in said image to avoid unwanted rendering artifacts and wherein an interpreter identifies said types of objects with respect to a job submitted by a user, said job including said image, and wherein said interpreter sends said job to an imager for said flattening for assigning said tag values and wherein said image objects are subject to a removal operation that removes a background image object among said image objects to generate a binary image that is subject to said connected component analysis to identify said negative text.

14. The processor-readable medium of claim 13 wherein said code performs said connected component analysis with respect to said image to identify elements in said image that should be rendered as objects composed of text and graphics, if said number of said connected components exceeds a threshold.

15. The processor-readable medium of claim 13 wherein said tag values include graphic tag values that are assigned to said objects comprising image objects if said number of connected components is greater than a predefined threshold.

* * * * *